(12) United States Patent
Wegner et al.

(10) Patent No.: US 12,038,116 B2
(45) Date of Patent: Jul. 16, 2024

(54) SUBSEA PIPELINES EQUIPPED WITH DIRECT ELECTRICAL HEATING SYSTEMS

(71) Applicant: Acergy France SAS, Suresnes (FR)

(72) Inventors: Alexis Wegner, Paris (FR); Vincent Boulliat, Garches (FR)

(73) Assignee: ACERGY FRANCE SAS, Suresnes (FR)

( * ) Notice: Subject to any disclaimer, the term of this patent is extended or adjusted under 35 U.S.C. 154(b) by 192 days.

(21) Appl. No.: 17/440,622

(22) PCT Filed: Mar. 16, 2020

(86) PCT No.: PCT/IB2020/000285
§ 371 (c)(1),
(2) Date: Sep. 17, 2021

(87) PCT Pub. No.: WO2020/188363
PCT Pub. Date: Sep. 24, 2020

(65) Prior Publication Data
US 2022/0163157 A1 May 26, 2022

(30) Foreign Application Priority Data

Mar. 19, 2019 (GB) ..................... 1903718

(51) Int. Cl.
| E21B 43/01 | (2006.01) |
| F16L 53/32 | (2018.01) |
| F16L 53/37 | (2018.01) |
| F16L 59/14 | (2006.01) |

(52) U.S. Cl.
CPC ............ *F16L 53/37* (2018.01); *F16L 53/32* (2018.01); *F16L 59/143* (2013.01); *E21B 43/01* (2013.01)

(58) Field of Classification Search
CPC . E21B 43/01; F16L 53/32; F16L 53/37; F16L 59/143
See application file for complete search history.

(56) References Cited

U.S. PATENT DOCUMENTS

| 6,278,095 B1 | 8/2001 | Bass et al. |
| 6,509,557 B1 | 1/2003 | Bass |
| 7,381,900 B2 | 6/2008 | Bremnes et al. |
| 7,669,659 B1* | 3/2010 | Lugo .................. E21B 36/04 |
| | | 166/61 |
| 8,705,949 B2 | 4/2014 | Kinnari et al. |
| 9,253,821 B2* | 2/2016 | Bremnes ............ E21B 36/04 |
| 9,964,249 B2 | 5/2018 | Bjerknes et al. |
| 2004/0040716 A1 | 3/2004 | Bursaux |

(Continued)

FOREIGN PATENT DOCUMENTS

| EP | 3 421 715 | 1/2019 |
| WO | WO 2004/111519 | 12/2004 |
| WO | WO 2013/124270 | 8/2013 |

*Primary Examiner* — Matthew R Buck
(74) *Attorney, Agent, or Firm* — MATTINGLY & MALUR, PC

(57) ABSTRACT

A heated subsea pipeline includes a direct electrical heating (DEH) system that heats a central major portion of the pipeline. Supplementary heating systems extend along respective end portions of the pipeline, longitudinally outboard of the central portion heated by the DEH system. A flow of heating fluid is circulated along the end portions and may be circulated through an underwater vehicle that pumps and heats the flow.

22 Claims, 5 Drawing Sheets

(56) References Cited

U.S. PATENT DOCUMENTS

2005/0061512 A1* 3/2005 Reid .................... E21B 33/037
166/302
2019/0137025 A1* 5/2019 Iversen .................. E21B 36/04

* cited by examiner

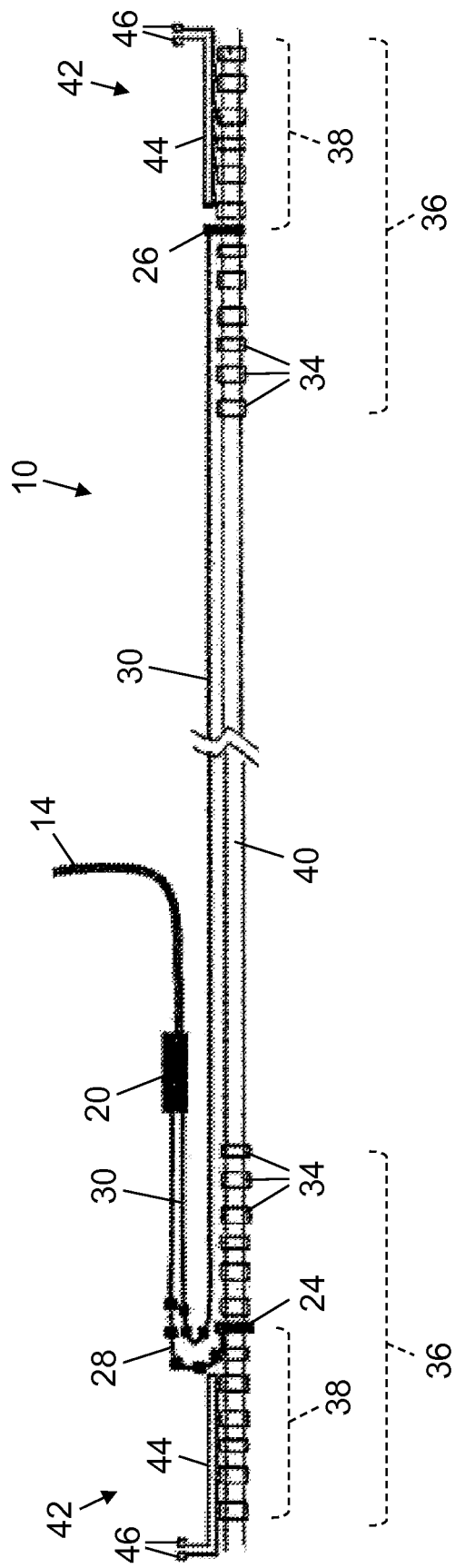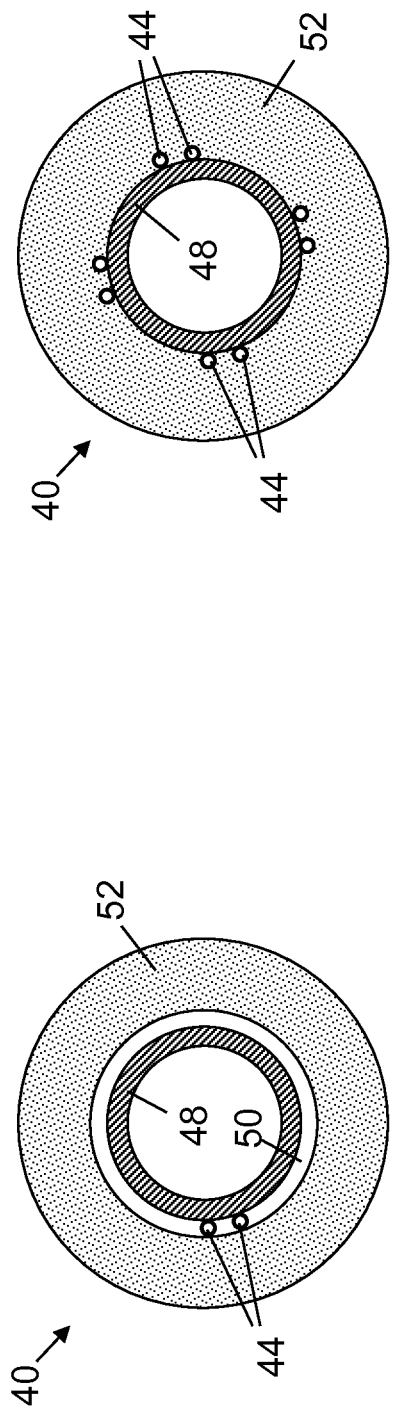
Figure 2
Figure 3
Figure 4

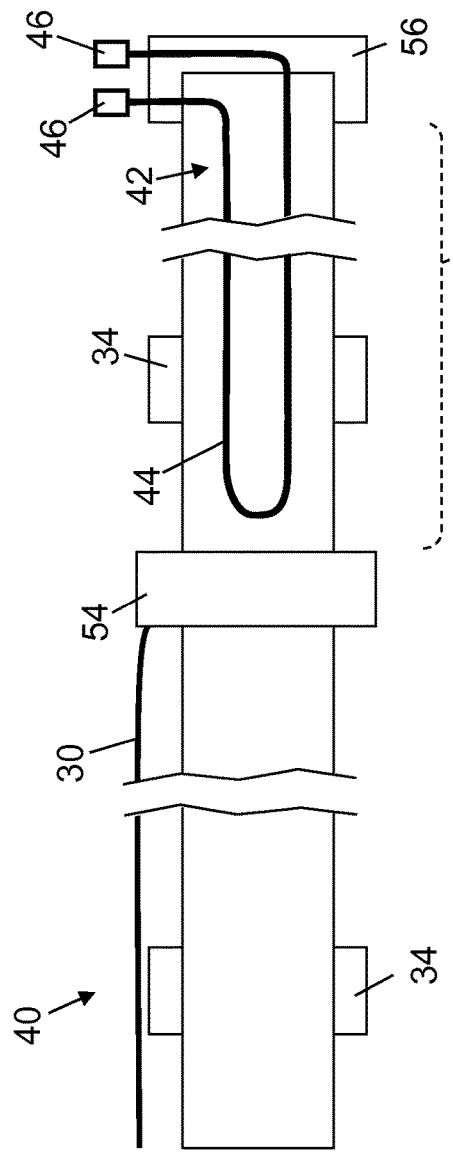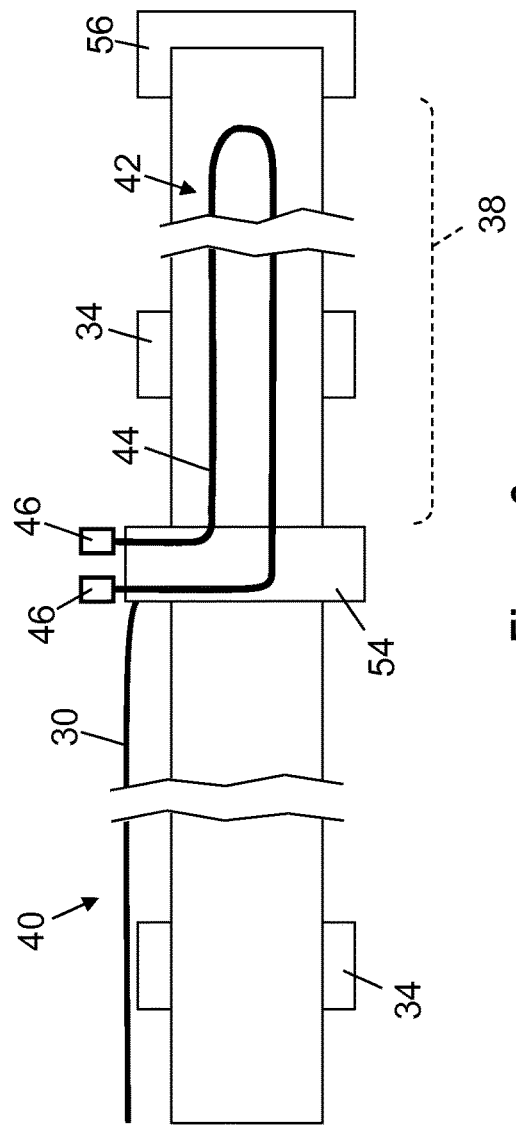

SUBSEA PIPELINES EQUIPPED WITH DIRECT ELECTRICAL HEATING SYSTEMS

This invention relates to the heating of subsea pipelines that are used in the production of hydrocarbon fluid. The objective of heating is to avoid a pipeline becoming clogged or plugged with solids that may otherwise appear in the fluid if its temperature falls too low within a given pressure range.

Oil and gas are present in subterranean formations at elevated temperature and pressure, which may be increased by the injection of fluids such as pressurised water. On production of oil or gas from subsea fields, the hot production fluid emerges from a subsea wellhead and enters a subsea pipeline in a multiphase state. The production fluid then flows in the pipeline across the seabed and eventually flows up a riser to the surface.

Low temperature increases the viscosity of the production fluid and promotes coalescence or precipitation of solid-phase materials from some components present in the production fluid, namely waxes and asphaltenes in crude oil and hydrates in natural gas. Such solid-phase materials tend to deposit and accumulate on the inner wall of the pipeline and may eventually cause plugs, which will interrupt production. Aside from the high cost of lost production, plugs are difficult and expensive to remove and can even sever a pipeline.

During transportation along a pipeline, the temperature and pressure of the production fluid have to be kept high enough to ensure a sufficient flow rate across the seabed and up a riser. In particular, various measures are taken to ensure that the internal temperature of the pipeline remains high, typically above 65° C. and in some cases above 200° C., despite thermal exchange with seawater which, for example, is at 4° C. below 1000 m depth.

Maintaining a sufficient temperature in a flow of hydrocarbons is straightforward while the hot flow continues but it becomes critical during a shutdown period. In this respect, all or part of a subsea oil or gas field must occasionally be shut down for maintenance. Shutdown may also occur on an unplanned basis in the event of an equipment failure or other anomaly. During shutdown, production is stopped and therefore hot production fluid no longer flows through the pipeline.

If the flow of production fluid stops for any reason, the temperature of the fluid left within the pipeline will decrease due to thermal exchange with the much colder surrounding seawater. Plugging becomes a risk if the temperature of the production fluid within the pipeline drops below the wax appearance temperature (WAT), or below other thresholds at which other solid materials will coalesce from oil or gas. Also, when production restarts, temperature within the pipeline must be increased quickly so that no plugs will form.

To avoid clogging by solid-phase materials, mitigating or displacement fluids such as methanol, diesel oil or dead crude oil may be injected into a production pipeline during a shutdown. Disadvantageously, such mitigation measures require the presence of specific equipment and storage facilities aboard a topside production installation. They also require the mitigating fluids to be transported to the relevant water depth against hydrostatic pressure, which is technically challenging. Also, when restarting production, mitigating fluids must be removed from a production pipeline. Typically this involves pushing the fluids out of the pipeline ahead of a pig propelled by incoming production fluid.

Another approach to flow assurance is to manage the temperature of a pipeline. Designers of subsea pipelines have adopted both passive and active approaches to thermal management, both individually and in combination.

In passive thermal management systems, a pipeline is thermally insulated. One example of a passive system is a pipe-in-pipe (PiP) structure comprising a fluid-carrying inner pipe positioned concentrically within an outer pipe. The inner and outer pipes are spaced from each other to define an insulating annulus between them. Typically, insulating material is disposed in the annulus; it is also possible to draw down a partial vacuum in the annulus to reduce transmission of heat through the annulus.

Among active thermal management systems, a trace heating system typically employs resistive electrical cables or wires running along, and in thermal contact with, the outer surface of a steel pipeline. Heat produced by passing an electric current along the wires is conducted through the pipe wall to the production fluid flowing within. Alternatively, the wires may heat the adjacent pipe wall by induction.

Direct electrical heating (DEH) of steel pipelines is also common. In a DEH system, the flowline pipe itself serves as an electrically-conductive impedance that carries an alternating electric current. The alternating current heats the wall of the flowline by a combination of Joule and skin effects, which in turn heats the production fluid. The system is so named because the steel flowline wall is heated directly by the current that flows through it. The temperature of the produced fluid can therefore be controlled by varying that current.

With reference to FIG. 1 of the drawings, a DEH system 10 draws electrical power from a power supply on a surface installation 12 such as an FPSO (a floating production, storage and offloading unit) or a platform. The surface installation 12 is exemplified here as an FPSO whose moorings have been omitted for clarity. For ease of illustration, the water depth is shown greatly reduced.

DEH systems are very large electrical loads that may typically have a power demand of 1 MW to 10 MW depending upon the length of the flowline they are designed to heat. Power demand will also depend upon whether the pipeline is being reheated for remediation or the temperature of the produced fluid is merely being maintained.

At least one power line such as an umbilical riser 14 hangs from the surface installation 12 to connect to the DEH system 10 of a steel pipeline 16 on the seabed 18 via a subsea junction box 20. The pipeline 16 will typically terminate at its opposed ends in subsea structures such as pipeline end terminations (PLETs) but these have been omitted from FIG. 1 for ease of illustration.

In total, at least two elongate conductors extend from the surface installation 12 to the DEH system 10. In a single-core arrangement, each conductor may be placed in an individual umbilical riser. Alternatively, as shown, two or more conductors may be combined in a single umbilical riser 14 in a twin- or multi-core arrangement, in which the conductors are spaced apart by insulating spacers.

The, or each, umbilical riser 14 has an insulating outer sheath and is armoured to resist dynamic stresses caused by wave action or tidal currents experienced in the water column between the surface 22 and the seabed 18. An umbilical riser 14 may also contain one or more fluid lines or fibre-optic cables, the former being for carrying service fluids to and from the pipeline 16 and the latter being for carrying data to and from the pipeline 16.

The DEH system 10 is installed on an electrically-isolated section of the pipeline 16. That DEH-heated central elongate portion of the pipeline may be several kilometres long, potentially tens of kilometres long.

The pipeline 16 may, for example, be fabricated offshore on, and laid from, an installation vessel using J-lay or S-lay techniques. In those techniques, steel pipe joints are welded successively at field joints to an upper end of a pipe string extending as a catenary toward the seabed from a hang-off mechanism or tensioner system of the vessel. The welds are tested and the field joints are coated before each new section of the pipe string is launched into the sea. The pipeline 16 may also be laid in reel-lay operations, in which a pipe is prefabricated from steel pipe joints at a coastal spoolbase that a reel-lay vessel visits for loading. At the spoolbase, the pipe is spooled onto a reel carried by the vessel. During subsequent pipelaying offshore, the pipe is unspooled from the reel, straightened and launched into the sea.

One of the elongate conductors in the umbilical riser 14 is connected electrically to the pipeline 16 by a first connection plate 24 close to one end of the isolated section. Another of those elongate conductors is connected electrically to the pipeline 16 by a second connection plate 26 close to the opposite end of the isolated section. In this way, the wall of the pipeline 16 serves as a conductor to complete an electrical circuit that also contains both of the elongate conductors and the power supply of the surface installation 12.

The connection plates 24, 26 exemplify connection points and serve as current injection points connected to the wall of the pipeline 16. Bulkheads may also serve as current injection points.

One of the elongate conductors in the umbilical riser 14 is connected to the first connection plate 24 at a near end of the pipeline 16 via an intermediate feeder cable 28. The other of those conductors is connected to the second connection plate 26 at the opposite, remote end of the pipeline 16 via an intermediate return line or DEH cable 30 that extends along the pipeline 16 from the near end to the remote end in a parallel piggybacked arrangement. The DEH cable 30 is attached to the pipeline 16 by fastenings 32 spaced at intervals along the length of the pipeline 16. Such fastenings 32 may comprise clamps, brackets or straps.

As the DEH cable 30 is vulnerable to damage, it is preferred to use the pipeline 16 to protect the DEH cable 30 during installation by launching the DEH cable 30 from an installation vessel already attached to the pipeline 16 in a piggybacked arrangement.

Piggybacking is a term of art in the subsea oil and gas industry and is well known to the skilled reader. Where elongate elements such as pipes or cables are to follow the same subsea route, it may be beneficial to install the elements simultaneously. This is commonly achieved by a piggyback technique where one or more secondary elements are attached by a succession of fastenings to a primary element on a pipelay vessel, and the elements are then launched together in parallel toward the seabed.

Piggybacking is most commonly used for installing two or more elongate pipe elements along the same subsea route, such as a primary larger-diameter pipe for carrying hydrocarbons and a secondary smaller-diameter pipe for carrying water, gas or chemicals used to produce hydrocarbons. It is also known that a secondary piggybacked element need not be a pipe for carrying fluids but may instead be a cable for carrying power or data. The secondary piggybacked element will usually be of much smaller diameter than the primary element on which it is piggybacked.

It is not practical to insulate the DEH system 10 electrically from the surrounding seawater, not least because sacrificial anodes are generally provided on the pipeline 16 for corrosion protection. Consequently, the DEH system 10 is electrically connected to the surrounding seawater by arrays 34 of additional sacrificial anodes mounted on the pipeline 16. Those arrays 34 typically extend up to about fifty metres to either side of each connection plate 24, 26 to define current transfer zones or CTZs 36. It follows that the electrical circuit includes not just the pipeline 16 but also the seawater surrounding the pipeline 16 between the CTZs 36. Thus, the DEH cable 30 serves as a forward conductor while the pipeline 16 and the surrounding seawater serve in parallel as a return conductor.

The description above exemplifies a closed-loop system. An open-loop system is also possible in which electrical power is supplied to one end of the pipeline 16 and the surrounding seawater alone serves as the return line. In that case, the DEH cable 30 may be omitted.

Another kind of closed-loop DEH system employs the outer pipe of a PiP assembly as a return conductor instead of a DEH cable. The PiP assembly also provides passive thermal management by virtue of its insulating annulus between the outer pipe and an inner pipe that serves as a flowline. U.S. Pat. No. 6,264,401 shows a typical PiP DEH system. The current injection points can be located at the ends of the pipeline or in the middle of the pipeline, especially in a PiP DEH system.

U.S. Pat. No. 7,381,900 discloses a DEH system in which the feeder cable is coaxial and is also used as a return cable. U.S. Pat. No. 6,509,557 describes an example of an open-loop DEH system. A single-phase or three-phase electrical power supply can be used. WO 2013/124270 discloses the use of a subsea transformer to supply power to a DEH cable.

WO 2004/111519 teaches a DEH system that is arranged to provide enough heat between two points to remediate the appearance of ice or hydrates in a gas condensate pipeline.

It will be apparent from the drawings of WO 2013/124270 and WO 2004/111519, and indeed from FIG. 1 of the present specification, that the current injection points are located longitudinally inboard of the respective ends of the pipeline. Thus, with reference to FIG. 1, end sections 38 of the pipeline 16 longitudinally outboard of the connection plates 24, 26 are not directly or effectively heated, at least not to the extent of the central DEH-heated portion of the pipeline 16. Those substantially unheated end sections 38 extend at least to the outboard ends of the respective CTZs 36, in which case the end sections 38 may each have a length of between a few metres and fifty metres. The unheated end sections 38 may even extend outboard beyond the CTZs 36 as shown.

Similarly, pipe sections that connect the pipeline ends to other subsea structures in fluid communication with the pipeline, such as spools or jumpers leading to wellheads or manifolds, are not heated.

The absence of heating in the end sections and in connecting pipe sections is not a problem in normal production because hot production fluid flows continuously into those pipe sections from nearby heated sections of the pipeline. However, during shutdowns, production fluid no longer flows and so cools due to thermal exchange with the surrounding seawater.

A DEH system may be activated during a shutdown to keep the temperature of production fluid in the pipeline above the WAT and above other thresholds at which other solid materials could coalesce from the production fluid, thus typically above 40° C. Despite some conduction of residual thermal energy along the pipe wall, the otherwise unheated end sections 38 may fall below this critical temperature, in which case solid plugs could appear in the production fluid.

The usual procedure in preparation for a shutdown of a DEH flowline is to flush at least the end sections 38 with a mitigating fluid such as methanol (MeOH) or monoethylene glycol (MEG). However, this preventative measure is costly due to the volumes of chemicals that have to be stored and used, and also due to the large pumps that are required at a surface or topside location.

In U.S. Pat. No. 6,278,095, a DEH circuit comprising cables and a pipeline feeds an induction loop to heat jumpers or pipeline extensions. Such a solution would be difficult to use on the pipeline ends because of the powerful electromagnetic field created by the DEH system in the main pipeline section. Consequently, a few metres of the pipeline may still suffer from cold spots.

EP 3421715 relates to a heating system for a flowline that includes a DEH conduit section and a trace heated conduit section.

Against this background, the invention provides a heated subsea pipeline that comprises: a direct electrical heating (DEH) system arranged to heat a central elongate portion of the pipeline; and at least one supplementary heating system extending along an end section or portion of the pipeline, longitudinally outboard of the central portion heated by the DEH system.

The central portion may extend along the pipeline between current transfer zones that are mutually spaced along the pipeline. In that case, the end portions may include longitudinally outboard portions of the current transfer zones. More specifically, the central portion may extend along the pipeline between current injection points that are mutually spaced along the pipeline. In that case, the end portions may be longitudinally outboard of the current injection points.

The supplementary heating system suitably comprises at least one heating element, which may be a small-diameter hot fluid conduit with a diameter of, for example, less than two inches (5.1 cm). The heating element is placed in thermal communication with an inner flowline of the pipeline, for example by being positioned in contact with the flowline.

The heating element is preferably surrounded by thermal insulation that encircles the flowline. For example, the heating element may be disposed within an annulus between the inner flowline and the thermal insulation, or may be embedded in the thermal insulation.

A feeder cable may be connected electrically to the flowline. A return cable may also be connected electrically to the flowline.

The pipeline of the invention may further comprise external connectors, such as hot stab couplings, for the supply of energy from an underwater vehicle to the supplementary heating system. Such connectors may conveniently be supported by a bulkhead, a connector plate or an end structure of the pipeline.

The inventive concept extends to a combination of the pipeline of the invention with an underwater vehicle that is configured to supply energy to the supplementary heating system. Such an underwater vehicle may carry connectors that are cooperable with the connectors of the pipeline to complete a heating circuit. The underwater vehicle may carry a pump that is arranged to drive a flow of heating fluid around the heating circuit, and/or a heater that is arranged to heat the flow of heating fluid.

The inventive concept also embraces a corresponding method of heating a subsea pipeline that is heated primarily by a direct electrical heating (DEH) system, the method comprising activating at least one supplementary heating system that extends along an end portion of the pipeline, longitudinally outboard of a central portion of the pipeline heated by the DEH system. The supplementary heating system may, for example, be activated to mitigate or to remediate plugging when the pipeline is shut down.

The supplementary heating system may, for example, be activated by circulating a heating fluid along the end portion of the pipeline. In that case, the method of the invention may comprise: connecting an underwater vehicle to the supplementary heating system; and circulating a flow of the heating fluid between the underwater vehicle and the supplementary heating system.

The flow of heating fluid may be pumped from the underwater vehicle into the supplementary heating system, and may be heated aboard the underwater vehicle.

Embodiments of the invention provide a DEH system comprising: a pipeline; at least one DEH cable to supply current to the pipeline for heating, connected to the pipeline at a cable termination; and at least one heating tube attached to the surface of the pipeline between the cable termination and the pipeline end. The or each heating tube may be heated temporarily during a shut-down phase. The diameter of the or each heating tube may, for example, by less than two inches (5.1 cm).

The at least one heating tube is suitably embedded into, or otherwise contained within or surrounded by, a thermally-insulating coating of the pipeline. At least two parallel heating tubes may be fluidly connected together to form a heating loop in which hot fluid can be circulated. For example, hot water may be flow through the loop with a temperature of 100° C., a flowrate of 3 m$^3$/h and under a pressure of at least 30 bar.

Each heating tube is conveniently terminated at an end by an underwater connector, for example of the hot stab type, for plug-in connection of an underwater heating and pumping system. The underwater heating and pumping system may, for example, be carried by an underwater vehicle such as an ROV, either on a skid carried by the ROV or as part of the ROV's on-board equipment.

Underwater connectors such as hot stabs may be at the pipeline end or at the cable termination means. The cable termination may be a connector, a plate and/or a bulkhead.

The heating tube may employ skin-effect heating, which may suitably be powered by an ROV.

In summary, the invention addresses the problems caused by delivering the large volume of chemicals previously required to mitigate plugging in the CTZs of DEH flowlines. Embodiments of the invention involve installing small-diameter heating tubes beneath the wet insulation coating covering the CTZs. These tubes may be looped together on one side or end and made accessible through ROV connection points on the other or opposite side or end.

The purpose of the heating tubes is to enable circulation of a hot fluid such as water, which may be injected by an ROV, to avoid, mitigate or remediate hydrate blockage along a CTZ section of a DEH system. Ultimately this remediation solution could remove the requirement for injection of MeOH or MEG at these pipeline locations.

Initial calculations indicate that circulating hot water at a temperature of 100° C. and a flowrate of 3 m$^3$/h would heat a 12" (30.5 cm) insulated pipe from 4° C. to 40° C. in about five hours. Circulating this flowrate through 1" (2.54 cm) ID tubes about 30 m long would require a pressure of 40 bar.

ROVs can achieve the necessary pressure and flow rate using existing water jet systems, which may be mounted on an ROV-transportable skid or provided onboard the ROV.

In one approach to incorporating the heating tubes, dedicated pipe joints that integrate the necessary piping may be fabricated onshore and introduced into a main pipeline fabrication line like any other standard pipe joint or in-line structure. Additional operations may be required to connect piping sections at welding stations where pipe joints are welded together. These operations could be performed by direct welding of piping sections or by using quick connectors or flexible connection pipes. Such connection points may then be covered by a thermally-insulating field joint coating to ensure the overall thermal efficiency of the heating and insulation system.

Thus, the invention is applied to a heated subsea pipeline comprising a direct electrical heating (DEH) system that heats a central major portion of the pipeline. Supplementary heating systems of the invention extend along respective minor end portions of the pipeline, longitudinally outboard of the central portion heated by the DEH system. A flow of heating fluid is circulated along the end portions, and may also be circulated through an underwater vehicle such as an ROV that pumps and/or heats the flow.

To set out the context of the invention, reference has already been made to FIG. 1 of the accompanying drawings. FIG. 1 is a schematic side view of a subsea pipeline fitted with a DEH system, as known in the prior art.

In order that the invention may be more readily understood, reference will now be made, by way of example, to the remainder of the accompanying drawings in which:

FIG. 2 is a schematic side view of a subsea pipeline fitted with a DEH system and supplementary heating systems in accordance with the invention;

FIG. 3 is a cross-sectional view taken through an end portion of the pipeline of FIG. 2 heated by one of the supplementary heating systems;

FIG. 4 is a cross-sectional view showing a variant of the arrangement shown in FIG. 3;

FIG. 5 is a schematic side view of an end portion of the pipeline of FIG. 2 showing a supplementary heating system arrangement;

FIG. 6 is a schematic side view showing a variant of the arrangement shown in FIG. 5;

Figure 1:
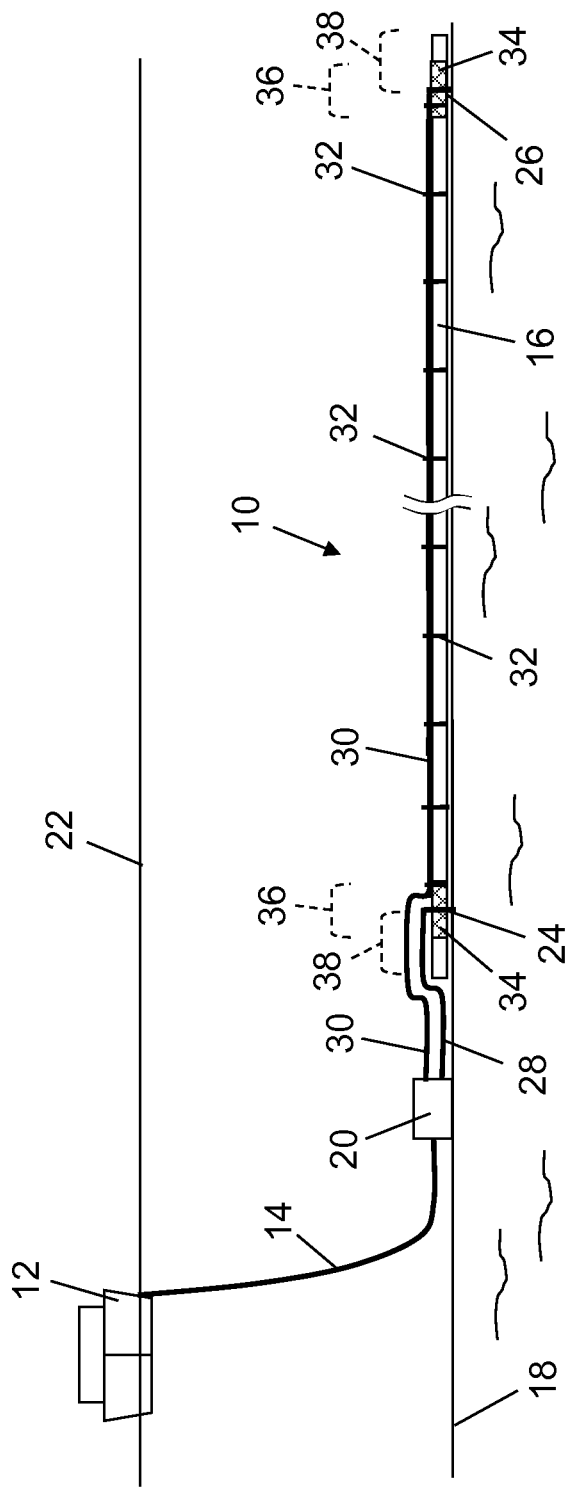

The steel pipeline 40 shown on the seabed 18 in FIG. 2 shares many similarities with the pipeline 16 shown in FIG. 1. Like numerals are therefore used for like features.

In this example, a coaxial umbilical riser 14 connects to the DEH system 10 of the pipeline 40 via a subsea junction box 20. Again, subsea structures in fluid communication with the pipeline 40, such as PLETs, have been omitted from FIG. 2. A surface installation such as an FPSO has also been omitted from FIG. 2.

As in FIG. 1, a first conductor of the umbilical riser 14 is connected electrically to the pipeline 40 via a feeder cable 28 coupled to a first connection plate 24 situated close to one end of an isolated section of the pipeline 40. A second conductor of the umbilical riser 14 is connected electrically to the pipeline 40 via a piggybacked DEH cable 30 coupled to a second connection plate 26 situated close to the opposite end of the isolated section. The connection plates 24, 26 are electrically connected to the wall of the pipeline 40 to serve as current injection points.

The DEH system 10 is electrically connected to the surrounding seawater by arrays of additional sacrificial anodes 34 mounted on the pipeline 40. Those arrays of anodes 34 define respective CTZs 36 that, as before, may extend up to about fifty metres to either side of each connection plate 24, 26.

End sections 38 of the pipeline 40 positioned longitudinally outboard of the connection plates 24, 26 extend at least to the outboard ends of the respective CTZs 36 and so each have a length of up to about fifty metres. The end sections 38 are bounded by the connection plates 24, 26 and are contiguous with the central DEH-heated portion of the pipeline 40.

In accordance with the invention, each end section 38 of the pipeline 40 is heated by a respective supplementary heating system 42 that is independent of the DEH system 10. Each supplementary heating system 42 comprises a heating element in the form of a looped heating conduit 44 for conveying a flow of hot fluid such as water along most or substantially all of the length of each end section 38. This warms the end sections 38 by thermal transmission between the conduit and the steel wall of the pipe 40 to avoid, or to remediate, plugging of the pipe 40 with solids at those locations.

In this example, each heating conduit 44 has two generally parallel limbs conjoined at one end by a U-section. At the opposite end of the heating conduit 44, free ends of the limbs communicate with respective hot-stab connectors 46 that enable an external pumping and heating system to be coupled temporarily to the conduit 44 when mitigation or remediation is required. As will be explained below with reference to FIG. 7, such a system is apt to be implemented by an ROV that docks with the conduit 44 via complementary connectors to complete a heating loop or circuit in which a hot fluid can be recirculated.

The cross-sectional view of FIG. 3 shows the two tubular limbs of the heating conduit 44 in contact with the exterior of a steel inner flowline 48 of the pipeline 40 to maximise thermal conduction between them. In this example, the conduit 44 is accommodated in an annulus 50 that is defined by a radial gap between the flowline 48 and a tubular layer of wet thermal insulation 52 encircling the flowline 48. Heat can propagate circumferentially and axially around and along the flowline 48 by convection through a volume of gas, such as air, trapped in the annulus 50.

As is well known in the art, the annulus 50 may be maintained by spacers extending radially between the flowline 48 and the insulation 52. Such spacers have been omitted from the drawings for ease of illustration but may be spaced longitudinally along and/or angularly around the flowline 48.

FIG. 4 corresponds to FIG. 3 but shows a variant in which multiple heating conduits 44 are spaced angularly around the flowline 48 to distribute heat more evenly. Alternatively those tubular features may represent multiple limbs of the same conduit 44 in fluid communication with each other. It will be apparent that similar arrangements may also be adopted within the annulus 50 of the variant shown in FIG. 3.

FIG. 4 also shows that the conduits 44 may be embedded in the insulation 52, which in this example is in direct contact with the flowline 48 to leave no annulus between them.

The insulation 52 shown in FIGS. 3 and 4 typically comprises a polymer material such as polypropylene or polyurethane. Such a polymer material may be provided as a solid layer or may instead be a matrix of a syntactic foam or of a composite material.

Turning next to FIGS. 5 and 6, these drawings show possible arrangements for supporting the hot stab connectors 46 shown in FIG. 2. In each case, part of the CTZ of the pipeline 40 is shown, comprising sacrificial anodes 34 spaced longitudinally along the pipeline 40. In these examples, a bulkhead 54 performs the current injection function of the connector plate 26 shown in FIGS. 1 and 2 and so is connected electrically to the DEH cable 30. A connector hub 56 is provided at the adjacent end of the pipeline 40.

The end section 38 of the pipeline 40 extends from the bulkhead 54 to the connector hub 56. The end section 38 accommodates a supplementary heating system 42 that comprises a heating conduit 44 whose limbs terminate in respective hot stab connectors 46. The hot stab connectors 46 are shown supported by the connector hub 56 in FIG. 5 but are instead shown supported by the bulkhead 54 in FIG. 6.

Figure 7:
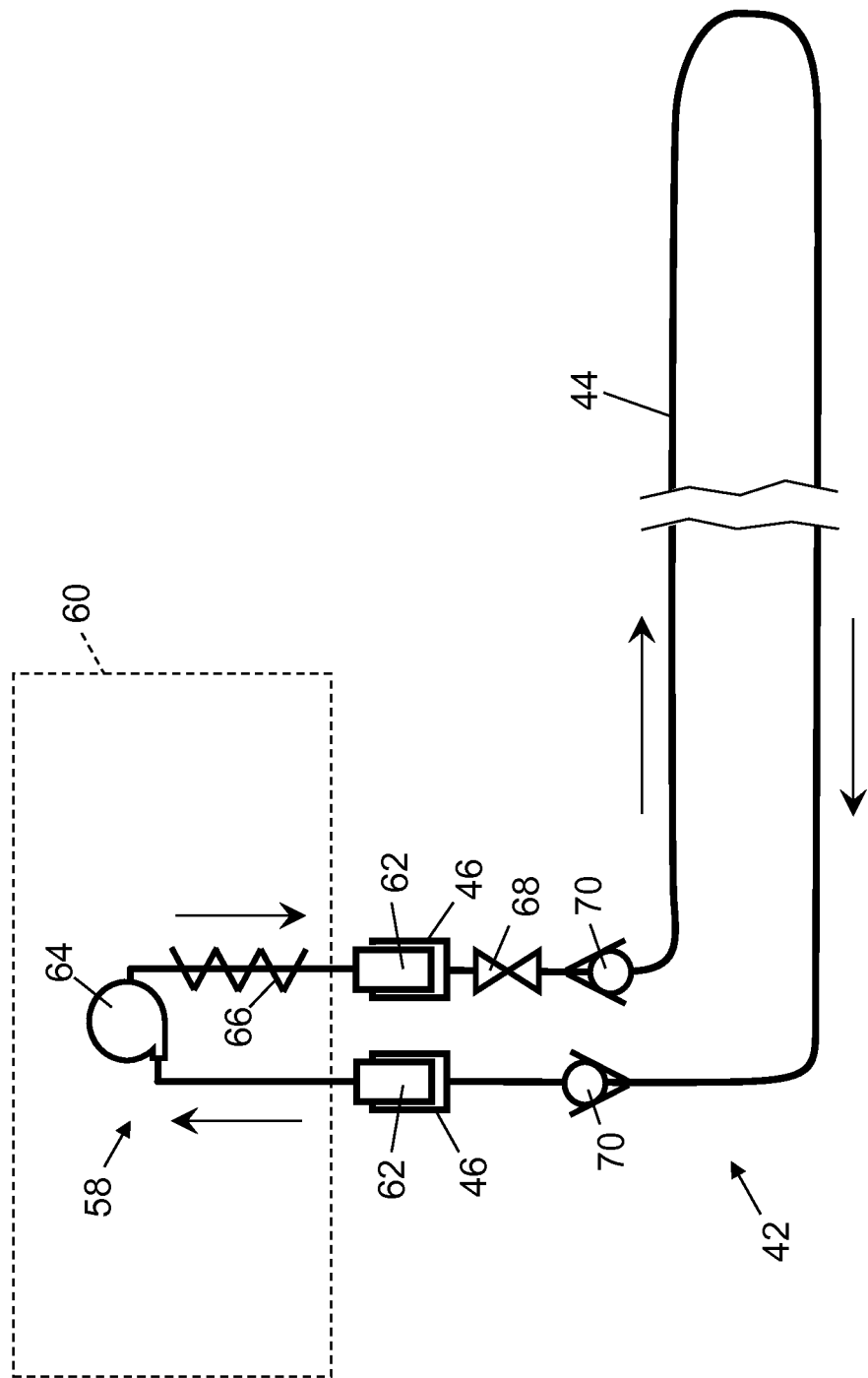
FIG. 7 is a schematic system diagram of a supplementary heating system of the invention, including parts of the system that may be implemented by an ROV.

FIG. 7 shows an external pumping and heating system 58 that can be coupled temporarily to the heating conduit 44 of a supplementary heating system 42 when mitigation or remediation is required. In this example, the pumping and heating system 58 is implemented on board an ROV 60 or on a skid carried by an ROV 60.

The ROV 60 docks with the hot stab connectors 46 of the heating conduit 44 via complementary connectors 62 to complete a heating loop or circuit for recirculation of hot water. In addition to the connectors 62, the pumping and heating system 58 comprises a pump 64 in series with an electrical heating unit 66.

FIG. 7 also shows further details of valve arrangements of the supplementary heating system 42. The flow of hot fluid through the heating conduit 44 is controlled by an inlet valve 68 and one-way flow in the heating conduit 44 is assured by opposed non-return valves 70.

Figure 8:
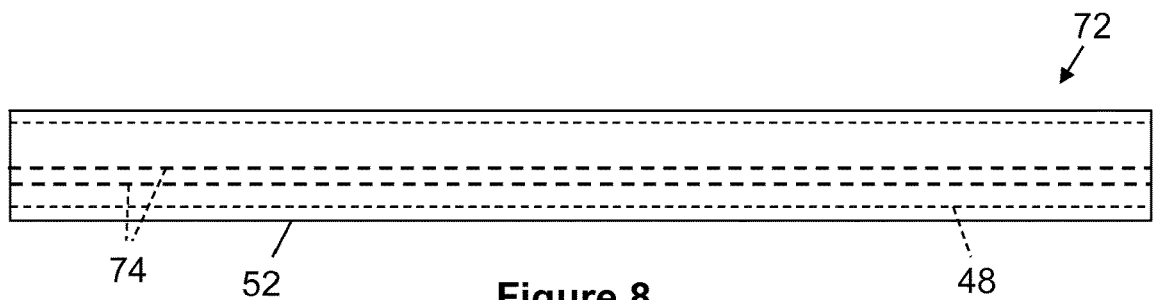
FIG. 8 is a schematic side view of a pipe joint adapted to implement a supplementary heating system of the pipeline of FIG. 2.

FIG. 8 shows a pipe joint 72 that can be incorporated into the pipeline 40 to implement at least part of the heating conduit 44. In this example, the pipe joint 72 is arranged to implement a central portion of the conduit 44 and so comprises parallel pipes 74 that extend the full length of the pipe joint 72. Each pipe 74 corresponds to a respective limb of the conduit 44. The pipes 74 are buried under, or encapsulated within, an outer layer of wet insulation 52 that surrounds an inner flowline 48.

Those skilled in the art will understand that a pipe joint is a length of pipe of a standard length of nominally twelve metres. Pipe joints may also be provided in lengths of multiples of twelve metres. Pipe joints are welded together end-to-end to fabricate a pipe string that is lowered to the seabed when installing a subsea pipeline.

Two or more pipe joints 72 may need to be joined end-to-end to complete the full length of the heating conduit 44. Other pipe joints 72 could therefore be provided to implement an end portion of the conduit 44, for example where the pipes 74 are conjoined by a U-section at which the flow of hot fluid within the conduit 44 reverses in direction. Alternatively, substantially all of the conduit 44 could be implemented on one pipe joint 72.

Figure 9:
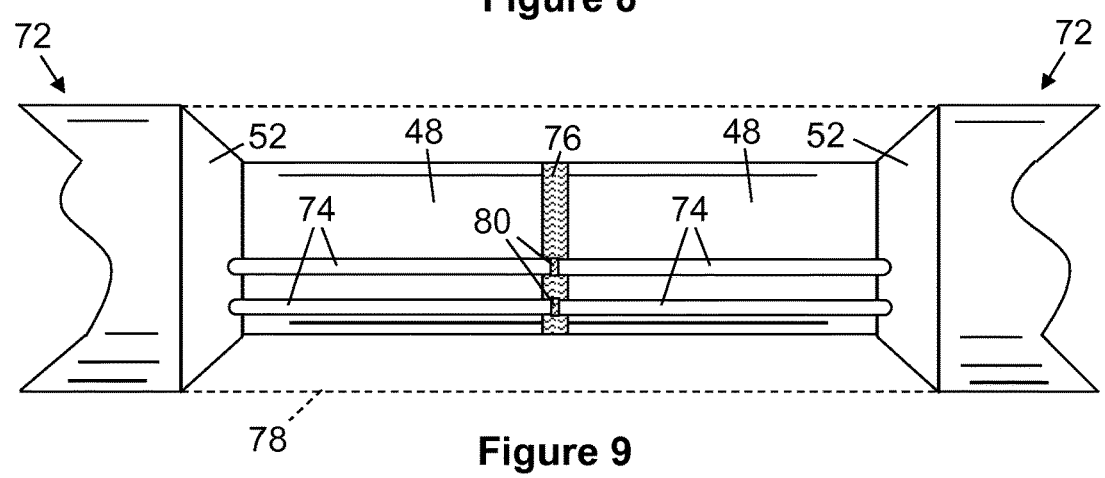
FIGS. 9 to 11 are schematic side views of various arrangements for field joints made between conjoined pipe joints of FIG. 8.
Figure 10:
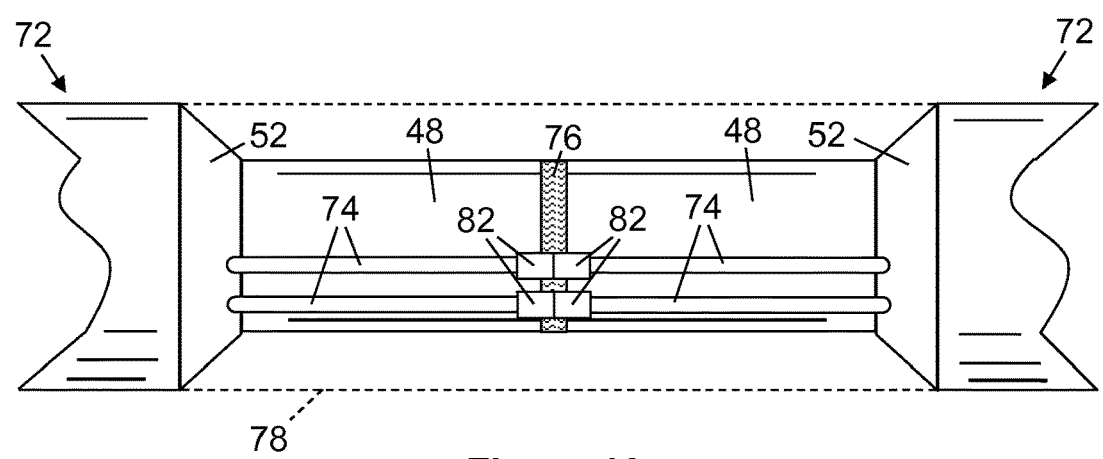
Figure 11:
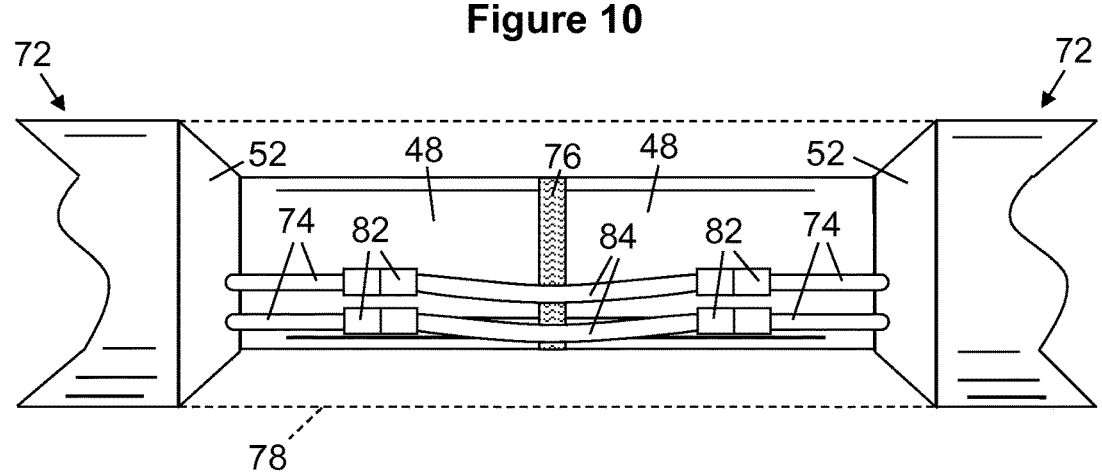

Turning finally to FIGS. 9 to 11, these drawings show field joints at which successive pipe joints 72 are welded together to form a pipeline 40. Here, connections must also be made between the pipes 74 of the successive pipe joints 72 so that those parts of the heating conduit 44 are brought into fluid communication with each other.

As is conventional, each field joint shown in FIGS. 9 to 11 comprises a circumferential butt weld 76 between successive lengths of the steel inner flowline 48 of the pipe joints 72. To facilitate welding, the thermal insulation 52 around those lengths of the inner flowline 48 is cut away from the end regions that face each other around the interface to be welded.

After welding together the successive lengths of the flowline 48, the pipes 74 are connected to their counterparts as shown in FIGS. 9 to 11. Thermal insulation is subsequently restored by forming a field joint coating 78 around the field joint, as shown in dashed lines in FIGS. 9 to 11, for example by moulding. Conveniently, the field joint coating 78 embeds or surrounds the pipes 74 and their connections and therefore retains heat applied to the flowline 48 by the heating conduit 44 in use.

FIGS. 9 to 11 show various connection arrangements between free ends of the pipes 74 that face each other across the field joint. In FIG. 9, the pipes 74 are joined together end-to-end by welds 80. Conversely, the pipes 74 are coupled end-to-end by complementary connectors 82 in FIG. 10. In FIG. 11, an intermediate tube 84 is inserted between each pair of opposed pipes 74. That intermediate tube 84 may comprise a flexible pipe as shown here, terminated by connectors 82. Alternatively, the intermediate tube 84 could be rigid, in which case welds 80 like those of FIG. 9 could be used instead of connectors 82.

Many variations are possible within the inventive concept. For example, it would be possible for a pumping and heating system to be connected permanently to the heating conduit of a supplementary heating system. This would enable the supplementary heating system to be activated whenever required, without requiring intervention by an ROV.

Limbs of the heating conduit of a supplementary heating system could have a different shape to that illustrated, for example with sinusoidal, undulating or helical curvature along the underlying pipeline. Also, the conduit could have more than two limbs, for example in a serpentine shape comprising multiple inflections.

Wet insulation surrounding the heating conduit could be replaced or supplemented by the outer pipe of a PiP assembly.

The invention claimed is:

1. A heated subsea pipeline, comprising:
   a direct electrical heating (DEH) system that is arranged to heat a central elongate portion of the pipeline;
   at least one supplementary heating system that extends along an end portion of the pipeline, longitudinally outboard of the central portion heated by the DEH system, wherein the supplementary heating system comprises at least one heating element in thermal communication with an inner flowline of the pipeline; and
   external connectors provided at ends of the at least one heating element for the supply of energy from an underwater vehicle to the supplementary heating system, wherein the connectors are supported by a bulkhead, connector plate or end structure of the pipeline.

2. The pipeline of claim 1, wherein the central portion extends along the pipeline between current transfer zones that are mutually spaced along the pipeline.

3. The pipeline of claim 2, wherein the end portions include longitudinally outboard portions of the current transfer zones.

4. The pipeline of claim 1, wherein the central portion extends along the pipeline between current injection points that are mutually spaced along the pipeline.

5. The pipeline of claim 4, wherein the end portions are longitudinally outboard of the current injection points.

6. The pipeline of claim 1, wherein the heating element is in contact with the flowline.

7. The pipeline of claim 1, wherein the heating element is surrounded by thermal insulation that encircles the flowline.

8. The pipeline of claim 7, wherein the heating element is disposed within an annulus between the inner flowline and the thermal insulation.

9. The pipeline of claim 7, wherein the heating element is embedded in the thermal insulation.

10. The pipeline of claim 1, wherein the heating element is a hot fluid conduit.

11. The pipeline of claim 10, wherein the conduit has a diameter of less than two inches (5.1 cm).

12. The pipeline of claim 1, in combination with a feeder cable that is connected electrically to the flowline.

13. The pipeline of claim 1, in combination with a return cable that is connected electrically to the flowline.

14. The pipeline of claim 1, wherein the connectors are hot stab couplings.

15. In combination, the pipeline of claim 1 with an underwater vehicle that is configured to supply energy to the supplementary heating system.

16. The combination of claim 15, wherein the underwater vehicle carries connectors that are cooperable with the connectors of the pipeline to complete a heating circuit.

17. The combination of claim 16, wherein the underwater vehicle carries a pump that is arranged to drive a flow of heating fluid around the heating circuit.

18. The combination of claim 17, wherein the underwater vehicle carries a heater that is arranged to heat the flow of heating fluid.

19. A method of heating a subsea pipeline that is heated primarily by a direct electrical heating (DEH) system, the method comprising:
  connecting an underwater vehicle to external connectors of at least one supplementary heating system that extends along an end portion of the pipeline, longitudinally outboard of a central portion of the pipeline heated by the DEH system, the external connectors being supported by a bulkhead, connector plate or end structure of the pipeline; and
  activating the supplementary heating system by circulating a flow of heating fluid between the underwater vehicle and the supplementary heating system, along the end portion of the pipeline.

20. The method of claim 19, comprising pumping the flow of the heating fluid from the underwater vehicle into the supplementary heating system.

21. The method of claim 19, comprising heating the flow of the heating fluid aboard the underwater vehicle.

22. The method of claim 19, comprising activating the supplementary heating system when the pipeline is shut down.

* * * * *